Figure 1:
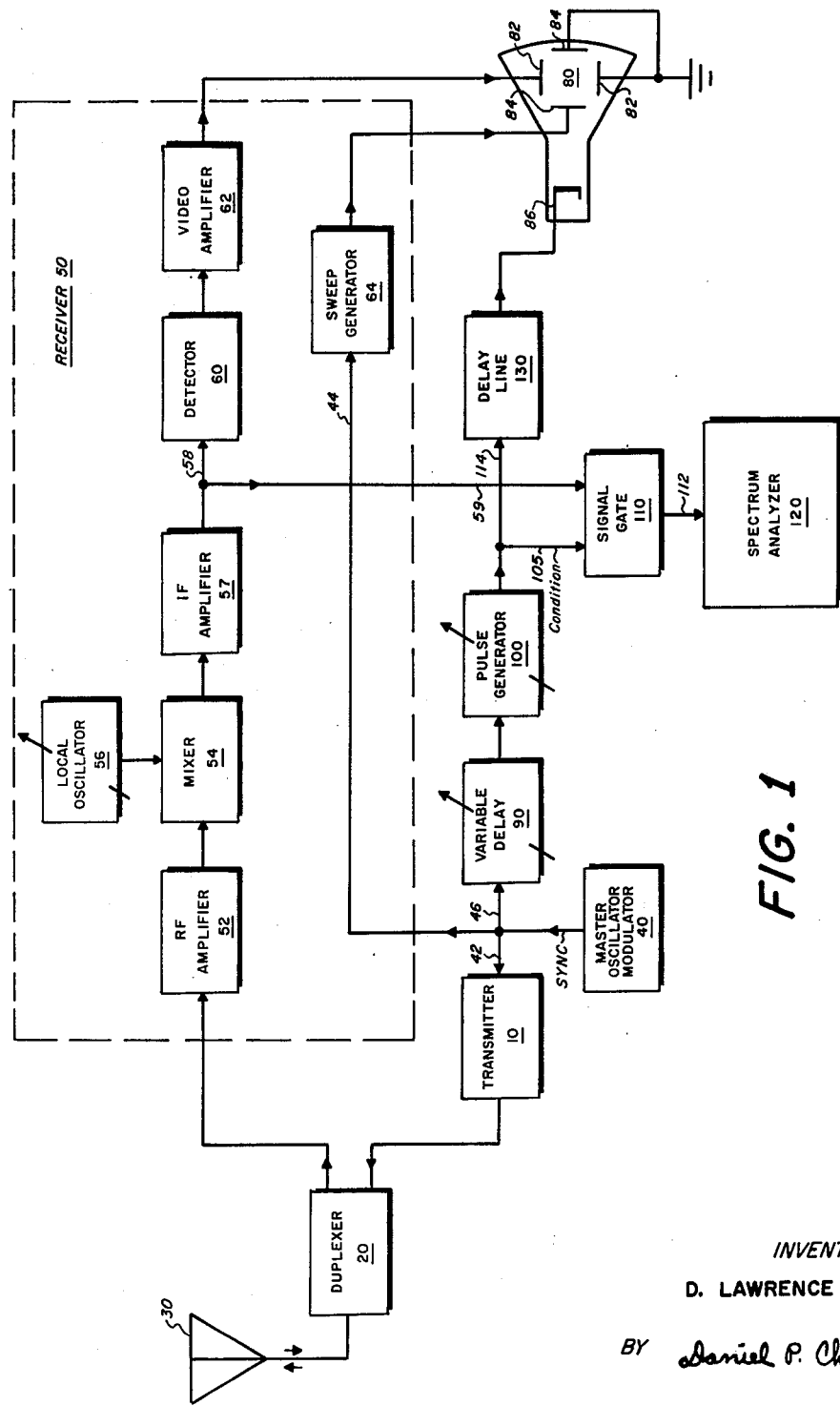

3,119,999
PULSE ECHO SPECTRUM ANALYZER
David Lawrence Jaffe, Great Neck, N.Y., assignor to Polarad Electronics Corporation, Long Island City, N.Y., a corporation of New York
Filed Aug. 18, 1960, Ser. No. 50,382
11 Claims. (Cl. 343—17.1)

This invention relates to pulse wave echo-ranging systems and, in particular, to means for performing a spectrum analysis on a selected one in a repetitive train of echo-return pulse waves and means for concurrently indicating the selected pulse wave on the system display showing the train of echo-return pulse waves.

In conventional radar and sonar echo-ranging systems the reflection by objects of repetitive transmitted pulse waves is utilized to detect, and locate the range of, targets in the field of the pulse energy emission. A transmitter emits a burst or pulse of large energy for a very short duration at a periodic rate, and then the range is measured in terms of the time interval between transmission of the pulse and the reception of the echo return from reflecting targets in the area of the emission field. The return echo is detected by a receiver which amplifies and presents the range information in suitable form for visual display on an indicator. The indicator usually is a cathode ray tube with distances on the screen of the tube calibrated proportional to the time interval between transmitted and echo pulses and thus to the range of the reflecting object. In the case of a radar echo ranging system the pulse waves are in the form of electromagnetic energy in the ultrahigh or microwave frequency range above 100 megacycles, whereas in the sonar echo ranging system the transmitted pulse waves are in the form of acoustical sound waves in the frequency range up to 40 or 50 kilocycles.

It is frequently desirable in both such echo ranging systems to perform an analysis on the energy spectrum of the transmitted pulse; that is, to measure, and provide an indication of, the amplitudes of the various frequency components which comprise the energy spectrum of the signal being analyzed. The waveform displayed on the indicator of such a spectrum analyzer provides much useful information about the nature of the transmitted pulse wave. Thus data concerning the frequencies present and their relative amplitudes, as well as the nature of modulation present, if any, may be determined from viewing the spectrum analyzer display, and, accordingly, such devices have found wide applicability for performing testing and checkout of the pulse transmission of echo ranging systems. Heretofore very little, if any, attention has been directed to means for obtaining a spectral analysis of the *return* pulses reflected by objects in the field of emission (as compared to the *transmitted* pulses) or to isolate one or more of such return pulses from the remainder of the echo-return group for spectral analysis purposes. By investigating the amplitude vs. frequency spectrum of the individual return pulses information may be obtained about the nature of the object-target which otherwise would not be readily ascertainable from the conventional video display of the echo-return pulse wave train on the indicator of the echo-ranging system. For example, a moving target would impress a frequency modulation on an incident pulse wave such that the reflected or return pulse wave would have a distorted amplitude vs. frequency spectrum as compared to that of the transmitted wave or the return from a stationary target. Similarly, the reflection of the wave front of a transmitted pulse wave from an object target containing a plurality of reflecting surfaces may result in a spectrum display of the echo-return which would also be helpful in identifying the characteristics of the object. Thus a spectral analysis of the return pulse from an object-target may provide indispensable assistance in identifying the nature of an object-target which otherwise would not be so determinable from the conventional echo ranging indicator display alone.

The instant invention provides a means therefore for isolating a selected one of the repetitive echo-return pulse wave group in an echo ranging system for presentation to a spectrum analyzer for purposes of investigation of the amplitude vs. frequency characteristic of the selected return pulse alone, and at the same time the invention provides a means for delineating the particular echo-return pulse so selected on the indicator display of the echo ranging system. The invention herein described is equally suitable for echo ranging systems of the sonar (acoustical) or radar (microwave) type and hence is of wide applicability in the fields of aviation and marine navigation, detection and identification.

In addition to the objects set forth above, it is a further objective of this invention to provide a pulse echo spectrum analyzer for use with an existing echo ranging system installation to provide means for observing the energy spectrum of a selected pulse of the echo return group and to indicate the pulse so selected on the indicator display of the existing system.

It is a still further object of this invention to provide means for isolating a selected pulse of a repetitive train of echo return pulse waves detected by a receiver in an echo ranging system for application to suitable utilization apparatus and to simultaneously provide an indication on the display of the echo ranging system of the particular pulse so selected.

Figure 2:
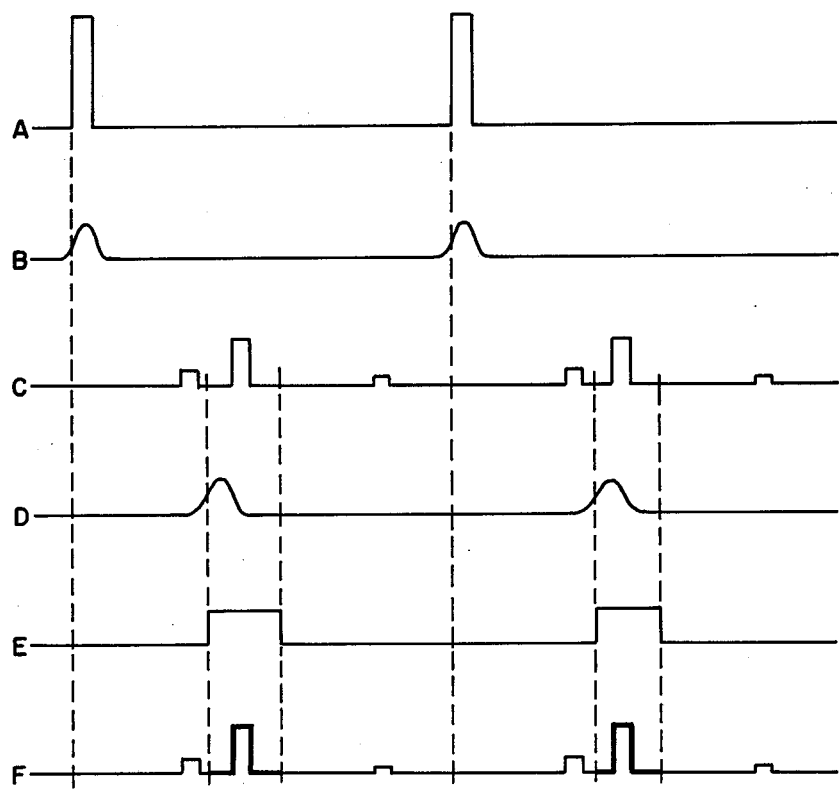

Other objects and advantages of the present invention will become apparent upon consideration of the following specification and annexed drawings in which;

FIGURE 1 is a schematic block diagram of a pulse echo spectrum analyzer according to the present invention; and FIGURE 2 is a set of idealized waveform diagrams of the system of FIGURE 1 which will be useful in explaining the theory and operation of the present invention.

The system shown in FIGURE 1 incorporates an echo-ranging system of the conventional radar type; however, it is to be understood that an echo-ranging system employing acoustical energy or lower frequency electromagnetic energy is equally suitable for use in accordance with the present invention. As illustrated therein, the system comprises a transmitter 10 for the generation of high energy pulse waves (shown at A in FIG. 2) of short duration at a periodic rate which are initiated by periodic trigger signals (shown at B in FIG. 2) received from master-oscillator-modulator 40 over lead 42. These pulse waves are supplied to transmitting antenna 30 through means of duplexer switch 20 which serves to separate the high energy sigals transmitted by the echo-ranging system from the low energy echo-return pulses received by the same antenna 30 and shunted by means of the duplexer 20 to the sensitive receiver circuitry, 50 of the system. Of course, separate transmitting and receiving antennas may be utilized in which instance a duplexing or anti-transmit–receive switch would not be necessary, as is well understood by those skilled in the art.

The echo-return signals (shown at C in FIG. 2) collected by the antenna 30 are directed by the duplexer 20 to receiver 50 which comprises conventional elements whose design and function are well understood and amply described in the literature and thus require no detailed explanation here. The echo-return signals are amplified by radio frequency amplifier 52 prior to the downconversion of the signals to intermediate-frequency through heterodyning with the local oscillator 56 at the mixer 54. The intermediate-frequency signals are then supplied to I.F. amplifier 57, one of whose outputs is connected over lead 58 to detector 60 for determination of the wave envelope of the incoming signals containing the desired echo-ranging information. The detected waveforms are then amplified by video amplifier 62 prior to their application to vertical-deflection plates 82 of display element 80, which typically is a cathode ray tube. Coincident with the application of the detected echo-return pulse to display element 80, sweep signals generated by element 64 are supplied to horizontal-deflection plates 84 of display element 80. These time-base sweep signals are similarly initiated by synchronizing signals derived over lead 44 from master-oscillator-modulator 40. Thus, the position of a particular envelope waveform, corresponding to an echo-return pulse reflected from a target in the emission field of the transmitting antenna 30, will appear on display element 80 at a position which is related in time, and hence in range, to the generation, and point of origin, of the transmitted pulse wave. This display, often times termed an A-scope presentation, wherein the envelope of the echo-return pulse wave is supplied to the vertical plates 82 of the cathode ray tube 80, and the sweep generator signals, synchronized by the master oscillator-modulator of the radar system, are applied to the horizontal plates 84, is one of echo-return pulse amplitude versus range, the displacement of the waveform signal along the abscissa or horizontal axis of the display corresponding to the distance of the reflecting target from the transmitting antenna. The system thus far described in greatly simplified detail corresponds to the conventional radar system well-known in the art, and for additional explanation reference is made to any of the well known texts in the field, e.g., Reintjes and Coate, "Principles of Radar" (3rd), McGraw-Hill, 1952. To continue now with the description of the invention, synchronizing signals from the master-oscillator-modulator 40 are supplied over lead 46 to variable-delay 90. The pulse generator 100 has adjustable means for generating pulses of variable width upon receipt of synchronizing signals supplied, after prescribed delay, (shown at D in FIG. 2) from the master-oscillator-modulator 40. The output of the pulse generator 100 (shown at E in FIG. 2) appears over lead 105 and serves to condition signal gate 110 which receives via lead 59 an output of the I.F. amplifier 57 of the radar receiver 50.

This output of I.F. amplifier 57 contains signals which correspond to the echo-return pulse waves of numerous targets in the field of pulses transmitted by the antenna 30. It is now desired to select a particular one of this train of echo-return pulse waves (e.g., the second pulse in the waveform train shown at C in FIG. 2) for application of a spectrum analyzer for investigation in view of the objectives previously mentioned. Accordingly, an output of the I.F. amplifier 57 is supplied to signal gate 110 which suppresses the passage of any signal through to its output except during that period where conditioning signals from pulse generator 100 are also applied to the gate over lead 105. Thus, by proper setting (as will be explained) of the variable delay line 90 and of the width control of pulse generator 100, only one selected pulse (the second one in the example of FIG. 2) of the echo-return pulse train may be caused to appear at the output of signal gate 110 for application over lead 112 to spectrum analyzer 120. For selection of a particular pulse, the synchronization signal from the master-oscillator-modulator 40 is delayed by adjustment of element 90 until just prior to the occurrence of the selected pulse (as shown at C and D in FIG. 2). The width of the condition signal supplied to the signal gate 110 by the pulse generator 100 is adjusted to be sufficiently long to completely "embrace"; i.e., exist in time concurrently (as shown at E in FIG. 2), the selected pulse without overlapping to any significant extent into the domain of the other echo-return pulse waves. Adjustment of the two controls, delay and width, may be made by the operator through observation of the presentation shown on the display 80, as will now be described.

The output of the pulse generator 100 is also supplied over lead 114 to a fixed delay line 130 and thence to the cathode 86 of cathode ray tube 80 to provide an intensity gate pulse thereon. The delay line 130 delays the intensity gate in order that it will be coincident with the arrival of the detected envelope waveform corresponding to the selected pulse of the train of echo-return pulse waves appearing at the vertical plates 82 of the cathode ray tube 80. The intensification provided serves to both visually indicate the time of occurrence and duration of the gate-condition signal and to delineate the particular pulse wave (shown at F in FIG. 2) selected for investigation by the spectrum analyzer 120 from the remainder of the echo-return pulse wave train appearing on the face of the cathode ray tube 80. Of course, means other than intensification of the selected pulse may be incorporated in the apparatus for delineating or emphasizing the selected pulse on the display; for example, a pedestal, triggered-blocking oscillator, or other means well-known to those skilled in the art may be utilized. Although the presentation is in the form of an A-scope, or amplitude versus range display, the invention is by no means so limited to this type presentation of radar information. By way of illustration, in the case of a plan-position-indicator (P.P.I.) display, wherein the amplitude information contained in the echo-return pulse waves is applied to the Z axis or intensification gate of the cathode ray tube and the display is in spherical coordinant form with range being indicated by the radius R from the origin and the azimuth orientation of the antenna by the angular position of the electron beam, the delineation of the selected pulse may be by means of circuitry designed to encompass the selected pulse on the display by a circle or other suitable geometric shape. Similarly, the signal gate 110 would require the simultaneous receipt of two conditioning pulses before passing the signals from the intermediate-frequency amplifier 57 to the spectrum analyzer 120 in the case of a P.P.I. radar system; namely, one conditioning signal received from the master-oscillator-modulator 40 after suitable delay and the other conditioning signal being received from suitable potentiometer stops on the shaft of the servo-motor determining the antenna's azimuth position, in order that only the selected pulse in the train of echo-return pulses received by the system be supplied to the spectrum analyzer 120 for investigation.

It will be appreciated to those skilled in the art that the invention is suitable for incorporation into existing radar and sonar installations with a minimum of modification, and further, that the invention utilizes components which are readily available on the commercial market. For this reason detailed description and schematic diagrams of the various elements have been omitted as such are readily obtainable from standard handbooks and technical publications in the field. Thus, by way of example but by no means limiting thereto, the pulse echo-ranging system may be of the type shown and described at pp. 46–53, Reintjes and Coate, "Principles of Radar," (3 ed.), McGraw-Hill, 1952; the spectrum analyzer 120 may be a model TSA spectrum analyzer presently marketed by the assignee of the present application, the pulse generator 100 and variable delay 90 may be combined in a single unit as in a model MP–1A coded multi-pulse generator also sold by this assignee; and signal gate 110 may be one of the several suitable types shown and described in chapter 14, Millman and Taub, "Pulse and Digital Circuits," McGraw-Hill, 1956.

Many variations of this invention will be readily apparent to those skilled in the art who may utilize the principles of the same in embodiments somewhat different than the one specifically illustrated and described herein. Accordingly, it is my desire that the scope of the invention be not deemed confined to such embodiment but solely by the following appended claims.

What is claimed is:

1. In a pulse wave echo-ranging system, the combination for performing a spectral analysis on a selected one of a group of repetitive echo-return pulse waves which are received after reflection from various targets comprising means for transmitting repetitive pulse waves, means for producing signals to trigger said transmitting means, receiving means for detecting and amplifying a group of echo-return pulse waves reflected by respective targets located in the field of said transmitted pulse waves, means for displaying said group of echo-return pulse waves, adjustable gating means responsive to the trigger signals and connected to said receiving means for passing a selected one of said group of echo-return pulse waves, and means connected to said gating means for performing a spectral analysis on said selected pulse wave passed by said gating means.

2. The combination set forth in claim 1 including means for delineating said selected pulse wave on said display means thereby providing an indication of the particular pulse wave selected supplied to said spectral analysis means.

3. In a pulse wave echo-ranging system, the combination for performing a spectral analysis on a selected one of a group of repetitive echo-return pulse waves which are received after reflection from various targets comprising first means for transmitting a repetitive pulse wave having a number of spectral components forming a characteristic amplitude-frequency spectrum, second means for detecting and amplifying a group of echo-return pulse waves reflected by respective targets located in the field of said transmitted pulse waves, said second means having a heterodyning stage for converting said echo-return pulse waves to pulse waves of a second frequency and a stage for detecting the envelopes of said pulse waves of said second frequency, third means for displaying said pulse envelopes, adjustable gating means connected to said second means for passing only a selected one of said second frequency pulse wave group, fourth means connected to said adjustable gating means for performing a spectral analysis on said selected pulse wave passed by said gating means to determine the amplitude-frequency characteristics of the spectral components forming the selected second frequency pulse wave, and fifth means for delineating the pulse envelope of said selected pulse wave from that of the remainder of said pulse wave group displayed on said third means thereby providing an indication of the selected second frequency pulse wave supplied to said fourth means.

4. In a pulse wave echo-ranging system, the combination for performing a spectral analysis on a selected one of a group of repetitive echo-return pulse waves which are received after reflection from various targets comprising means for generating and transmitting a repetitive pulse wave of a first frequency; means for producing signals to trigger said transmitting means; receiving means for detecting and amplifying the received echo-return pulse waves reflected by targets located in the field of said transmitted pulse waves, said receiving means having heterodyning means for converting said first frequency echo-return pulse waves into echo-return pulse waves of a second frequency, and means for detecting the envelopes of said echo-return pulse waves of said second frequency; means for displaying said pulse envelopes; gating means, means for applying said second frequency pulse waves to said gating means, means responsive to said trigger signals for producing signals of variable time duration and occurrence, said gating means being conditioned by said signals of variable time duration and occurrence for passing only a selected one of said second frequency pulse waves; means connected to said gating means for performing a spectral analysis on said selected second frequency pulse wave; and means for delineating the pulse envelope of said selected pulse wave from that of the remainder of said pulse waves displayed on said display means thereby indicating the particular pulse wave of said second frequency selected and supplied to said spectral analysis means.

5. In a pulse wave echo-ranging system, the combination for performing a spectral analysis on a selected one of a group of repetitive echo-return pulse waves which are received after reflection from various targets comprising means for generating and transmitting a repetitive pulse wave of a first frequency; receiving means for detecting and amplifying a group of echo-return pulse waves reflected by targets located in the field of said transmitted pulse waves, said receiving means including heterodyning means for converting said first frequency echo-return pulse waves into pulse waves of a second frequency, means for detecting the envelopes of said pulse waves of second frequency; swept-voltage generator means; means for displaying said detected pulse envelopes representative of said echo-return pulse wave group, said display means having a vertical deflection channel to which an output of said pulse-envelope detecting means is applied, a horizontal deflection channel to which an output of said swept-voltage generator means is supplied, and means for selectively varying a portion of the intensity of the display presented on said display means; gating means connected to said receiving means for passing through to an output only a selected one of said second frequency pulse waves, said gating means being conditioned for passage of said selected pulse wave to said output by means producing a selection signal of adjustable duration and adjustable time of occurrence with respect to the generation of said transmitted pulse waves, means connected to said output of said gating means for performing a spectral analysis on said selected second frequency pulse wave, and means connecting said selection signal-producing means to said intensity-varying means for producing an intensification of a portion of the display indicative of the particular pulse wave of said received echo-return pulse waves selected for analysis by said spectral analysis means.

6. The combination as set forth in claim 5 further comprising delay line means interposed between said selection signal-producing means and said intensity-varying means of said display means thereby to cause the intensified portion of the display to occur substantially simultaneously with the application of the detected pulse-envelope of the selected pulse wave to said vertical deflection channel of said display means.

7. The combination as set forth in claim 5 further comprising master oscillator-modulator means for providing a synchronizing signal for the time-base operation of said pulse wave generator and transmitter means, said swept-voltage generator means, and said selection signal-producing means.

8. The combination as set forth in claim 7 further characterized by adjustable delay means interposed between said master oscillator-modulator means and said selection signal-producing means for delaying the application of said synchronizing signal to said selection signal-producing means for a predetermined duration thereby to provide for the selection of the desired second frequency pulse wave.

9. The combination set forth in claim 1 wherein the transmitting means of said pulse wave echo-ranging system includes means for producing and transmitting pulse waves in the form of electromagnetic energy.

10. The combination set forth in claim 1 wherein the transmitting means of said pulse echo-ranging system includes means for producing and transmitting pulse waves in the form of acoustic energy.

11. The combination set forth in claim 1 wherein said display means is of the straight line time base type for producing an A-scope presentation corresponding to echo-return pulse wave amplitude vs. range.

References Cited in the file of this patent

UNITED STATES PATENTS

| | | |
|---|---|---|
| 2,905,894 | Rudmann | Sept. 22, 1959 |
| 2,911,564 | Jaffe et al. | Nov. 3, 1959 |

UNITED STATES PATENT OFFICE
CERTIFICATE OF CORRECTION

Patent No. 3,119,999            January 28, 1964

David Lawrence Jaffe

It is hereby certified that error appears in the above numbered patent requiring correction and that the said Letters Patent should read as corrected below.

Column 3, line 69, for "of" read -- to --.

Signed and sealed this 16th day of June 1964.

(SEAL)
Attest:

ERNEST W. SWIDER
Attesting Officer

EDWARD J. BRENNER
Commissioner of Patents